United States Patent [19]

Ohyama et al.

[11] Patent Number: 4,519,344
[45] Date of Patent: May 28, 1985

[54] V-TYPE INTERNAL COMBUSTION ENGINE

[75] Inventors: Kazuo Ohyama; Takashi Kitami, both of Saitama, Japan

[73] Assignee: Honda Giken Kogyo Kabushiki Kaisha, Tokyo, Japan

[21] Appl. No.: 440,031

[22] Filed: Nov. 8, 1982

[30] Foreign Application Priority Data

Nov. 7, 1981 [JP] Japan .................................. 56-177831
Nov. 7, 1981 [JP] Japan .................................. 56-177832

[51] Int. Cl.³ .............................................. F02B 75/06
[52] U.S. Cl. ............................ 123/55 VF; 123/192 B; 74/603
[58] Field of Search ............. 123/55 R, 55 V, 55 VE, 123/55 VS, 55 VF, 192 B, 192 R, 53 R, 53 A, 53 B; 74/603, 604

[56] References Cited

U.S. PATENT DOCUMENTS 2,957,455 10/1960 Bouvy ........................... 123/55 VS
4,351,202 9/1982 Summers ........................ 123/53 A

FOREIGN PATENT DOCUMENTS 0134887 3/1979 Fed. Rep. of Germany ... 123/192 B

Primary Examiner—Craig R. Feinberg
Assistant Examiner—David A. Okonsky
Attorney, Agent, or Firm—Lyon & Lyon

[57] ABSTRACT

Engines having multiples of two and three cylinders which are arranged in V configurations. These engines employ nonaligned crankpins and arbitrary included angles between cylinders. Through appropriate relationships between crankpins and the weight, residual linear inertial forces are substantially eliminated.

1 Claim, 4 Drawing Figures

V-TYPE INTERNAL COMBUSTION ENGINE

BACKGROUND OF THE INVENTION

The field of the present invention is multi-cylinder V-type engines.

In conventional V-type multi-cylinder internal combustion engines, the included angle between banks of cylinders has generally been established as 90° for two or four cylinders and 45° or 90° for eight cylinders. These angles have been established to make possible the balancing of the linear term of the residual unbalanced inertia forces of the reciprocating masses, including the pistons, connecting rods and the like. Such V-type engines typically include aligned or common crankpins associated with pairs of cylinders, one from each of the two banks of cylinders. With such an arrangement, it is not possible to negate the linear term of residual unbalanced inertia forces of the reciprocating masses through the use of a balance weight on the crank if the included angle between cylinder banks is established at an arbitrary value other than as indicated above. Thus, it is relatively impractical to employ an arbitrary V angle other than 90°, also 45° in the case of an eight-cylinder. However, in certain cases, particularly where rigid space requirements exist, it would be advantageous to employ an included angle in a V-type multi-cylinder engine other than the fixed 90° or 45°.

SUMMARY OF THE INVENTION

The present invention is directed to a V-type multi-cylinder internal combustion engine employing arbitrary included angles between banks of cylinders while balancing the linear term of residual unbalanced inertia force. To this end, individual crankpins arranged in a nonaligned manner are employed for each cylinder. Balance weights are provided at critical points as are the crankpins to achieve a balanced condition. In this way, an arbitrary V angle may be employed. Such a system may be used for V-type internal combustion engines employing numbers of cylinders in multiples of two or three.

Accordingly, it is a principal object of the present invention to provide for internal combustion engines of a V-type having included angles between the banks of cylinders not constrained to the conventional included angles. Other and further objects and advantages will appear hereinafter.

DETAILED DESCRIPTION OF THE PREFERRED EMBODIMENT

Figure 1:
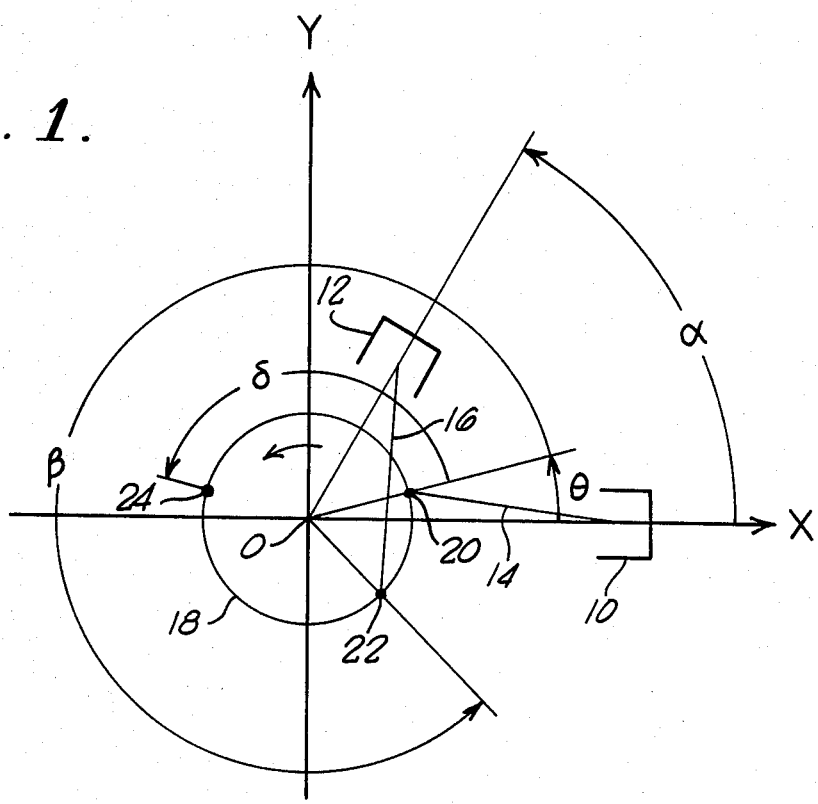
FIG. 1 is a schematic illustration of the angular arrangements between components in a V-type internal combustion engine having cylinders in multiples of two.
Figure 2:
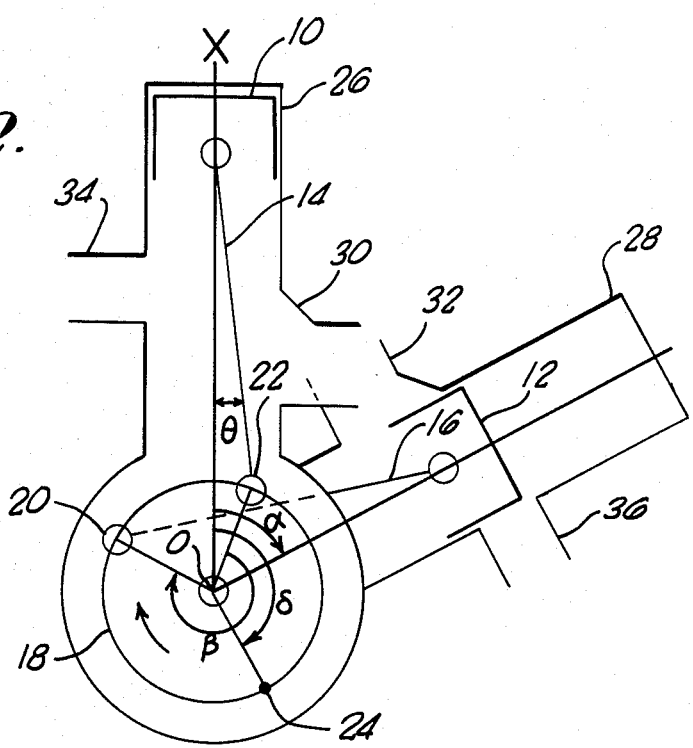
FIG. 2 is a schematic illustration of an embodiment of the engine of FIG. 1.

Turning first to FIGS. 1 and 2, a two-cycle internal combustion engine employing two cylinders in a V arrangement is illustrated. In FIG. 1, two pistons 10 and 12 are schematically illustrated along with corresponding connecting rods 14 and 16 attached at a first end to the pistons 10 and 12 and at a second end to a crank 18 at crankpins 20 and 22. The crank 18 rotates about a point "O" and includes a balance weight 24.

In FIG. 2, cylinders 26 and 28 are illustrated in conjunction with the reciprocating mass of the pistons 10 and 12 and connecting rods 14 and 16. Intakes 30 and 32 are illustrated for a two-stroke engne design as well as exhaust ports 34 and 36. The cylinders 26 and 28 constitute a first pair of cylinders which may be repeated to form banks of cylinders extending axially along the crank 18.

Looking then to the angular and mass relationships according to the present invention with respect to FIGS. 1 and 2, this relationship is illustrated on coordinates "X" and "Y" in a conventional complex plane. The piston 10 and cylinder 26 are aligned with the X axis. The included angle between the cylinders 26 and 28 is illustrated as "$\alpha$". The reciprocating masses each defined by a piston, connecting rod and the attendant components such as a piston pin and the like, each have a weight referred to as "W". In the following gravitational acceleration is identified as "g", the crank radius as "r", the angular velocity of the engine as "$\omega$", the center angle of one crankpin 20 associated with the piston 10 aligned along the X axis as "$\theta$", the angle between the first crankpin 20 and the second crankpin 22 as measured about the crank 18 at its axis O as the angle "$\beta$" and the linear inertia forces as "Fa" and "Fb" for each of the two composite reciprocating masses.

Making reference to the foregoing terms, the following relationship will apply:

$$Fa = W/gr\theta^2 \cos\theta \qquad (1)$$

$$Fb = W/gr\omega^2 \{\cos(\theta + \beta - \alpha)\}e^{i\alpha} \qquad (2)$$

The foregoing being defined in a complex plane. Additionally, the balance weight 24 has a weight "A". The weight A is preferably integrally provided on the crank 18 to provide a centrifugal force "Fw" balancing the sum of the linear inertial forces Fa and Fb as follows:

$$Fw = A/gr\omega^2 e^{i\theta} \qquad (3)$$

$$Fa + Fb = Fw \qquad (4)$$

From the equations (1) and (2):

$$Fa + Fb = W/gr\omega^2[\cos\theta + \{\cos(\theta + \beta - \alpha)\}e^{i\alpha} \qquad (5)$$

And, those in the above brackets become:

$$\cos\theta + \{\cos(\theta + \beta - \alpha)\}e^{i\alpha} \qquad (6)$$

$$= \cos\theta + \{\cos(\theta + \beta - \alpha)\}(\cos\alpha + i\sin\alpha)$$

$$= \cos\theta + \cos(\theta + \beta - \alpha)\cos\alpha + i\cos(\theta + \beta - \alpha)\sin\alpha$$

$$= \cos\theta + \{\cos\theta \cdot \cos(\beta - \alpha) - \sin\theta \cdot \sin(\beta - \alpha)\}\cos\alpha +$$

$$i\{\cos\theta \cdot \cos(\beta - \alpha) - \sin\theta \cdot \sin(\beta - \alpha)\}\sin\alpha +$$

$$= \cos\theta\{1 + \cos(\beta - \alpha) \cdot \cos\alpha + i\cos(\beta - \alpha) \cdot \sin\alpha -$$

$$\sin\theta\{\sin(\beta - \alpha) \cdot \cos\alpha + i\sin(\beta - \alpha) \cdot \sin\alpha\}$$

Generally, because $$\cos\theta = \tfrac{1}{2}(e^{i\theta} + e^{-i\theta}),$$

$$\sin\theta = \tfrac{1}{2}(e^{i\theta} - e^{-i\theta}),$$

then the above equation (6) becomes:

$$\frac{e^{-i\theta}}{2}[1 + \cos(\beta - \alpha)\cdot\cos\alpha - \sin(\beta - \alpha)\cdot\sin\alpha + \quad (7)$$

$$i\{\cos(\beta - \alpha)\cdot\sin\alpha + \sin(\beta - \alpha)\cos\alpha\}]$$

$$\frac{e^{-i\theta}}{2}[1 + \cos(\beta - \alpha)\cdot\cos\alpha + \sin(\beta - \alpha)\cdot\sin\alpha +$$

$$i\{\cos(\beta - \alpha)\cdot\sin\alpha - \sin(\beta - \alpha)\cos\alpha\}]$$

In order that the right side of the equation (3) and the right side of the equation (5) become equal so as to satisfy the equation (4), the real number part and imaginary number part in the second brackets of the equation (7) must be O.
That is, $$1 + \cos(\beta - \alpha)\cos\alpha + \sin(\beta - \alpha)\sin\alpha = 0 \quad (8)$$

$$\cos(\beta - \alpha)\sin\alpha - \sin(\beta - \alpha)\cos\alpha = 0 \quad (9)$$

From the equation (8):

$$1 + \cos(\beta - \alpha - \alpha) = 0 \quad (10)$$

$$\cos(\beta - 2\alpha) = -1$$

$$\beta - 2\alpha + = -180°$$

And, from the equation (9):

$$\sin(\beta - \alpha - \alpha) = 0 \quad (11)$$

$$\beta - 2\alpha + \pm 180°$$

To make both equations (10), (11) consist together:

$$2\alpha - \beta = 180 \quad (12)$$

In the case where the linear inertia forces Fa and Fb are balanced by Fw, the weight "A" of the balance weight 24 is:

$$A = \tfrac{1}{2}W\sqrt{U^2 + V^2} \quad (13)$$

where
$$U = 1 + \cos(\beta - \alpha)\cos\alpha - \sin(\beta - \alpha)\sin\alpha$$

$$V = \cos(\beta - \alpha)\sin\alpha + \sin(\beta - \alpha)\cos\alpha$$

Additionally, the installed angle of the weight 24 as measured in the same direction corresponding with previous angles about the crank 18 from the first crankpin 20 is defined as "δ". This installed angle of the balance weight 24 becomes:

$$\tan\delta = V/U \quad (14)$$

Referring to the embodiment of FIG. 2, an included angle α of 60° was selected in a two-cycle, two-cylinder internal combustion engine. Working through the foregoing calculations, the angle β becomes −60°, principally in accordance with the aforementioned equation (12). The installed angle δ of the weight 24 on the crank 18 is equal to 150° according to the equation (14) with the weight A equal to $W/2\sqrt{3}$ in accordance with the equation (13).

With the embodiment of FIG. 2 composed as described above, the linear inertia forces Fa and Fb possessed by the two reciprocating masses are:

$$Fa = W/gr\omega^2\cos\theta$$

$$Fb = W/gr\omega^2\cos(\theta - \pi/3)e^{i\alpha}$$

and the centrifugal force Fw of the balance weight is:

$$Fw = W/gr\omega^2\sqrt{3}/2\, e^{i\theta} \quad (15)$$

according to the equations (3) and (13).
As is clear from the equations (5), (6) and (7), the sum of said inertia forces Fa, Fb is:

$$Fa + Fb = W/gr\omega^2\tfrac{1}{2}(3 - \sqrt{3}i)e^{i\theta}$$

and the absolute value of its complex number 3-3 i is 12, so that:

$$Fa + Fb = W/gr\omega^2\sqrt{3}/2\, e^{i\theta} \quad (16)$$

then, the equation (15) and the equation (16) are equal, and therefore, in the embodiment shown in FIG. 2, the linear inertia forces Fa, Fb possessed by the one reciprocating part and the other reciprocating part balance the centrifugal force Fw of the balance weight 4, resulting in less vibration.

In the embodiment, the included angle is shown to be 60°. However, this angle may be freely set as may be required or advantageous. The angle β may then be derived in accordance with the equation (12) and the weight established in accordance with the equations (13) and (14). It would be a clear equivalent to divide the balance weight into two or more pieces for convenience of arrangement.

In accordance with the foregoing, V-type internal combustion engines wherein the number of cylinders in one cylinder bank is equal to the number of cylinders in the other cylinder bank, a specified balance weight may be provided at a specified point in the crank when twice the included angle between cylinders α—the angle between crankpins β is equal to 180° which creates balanced residual inertia forces to make possible internal combustion engines with less vibration. Therefore, one is able to make a free choice over the cylinder included angles. Furthermore, the crankpins in such an arrangement are generally nonaligned and cannot be common to a set of cylinders. As a result, two-cycle internal combustion engines where crankcase compression is employed and separate crankpins must be used may advantageously take advantage of the present invention without additional complexity not previously required by the nature of the engine.

Figure 3:
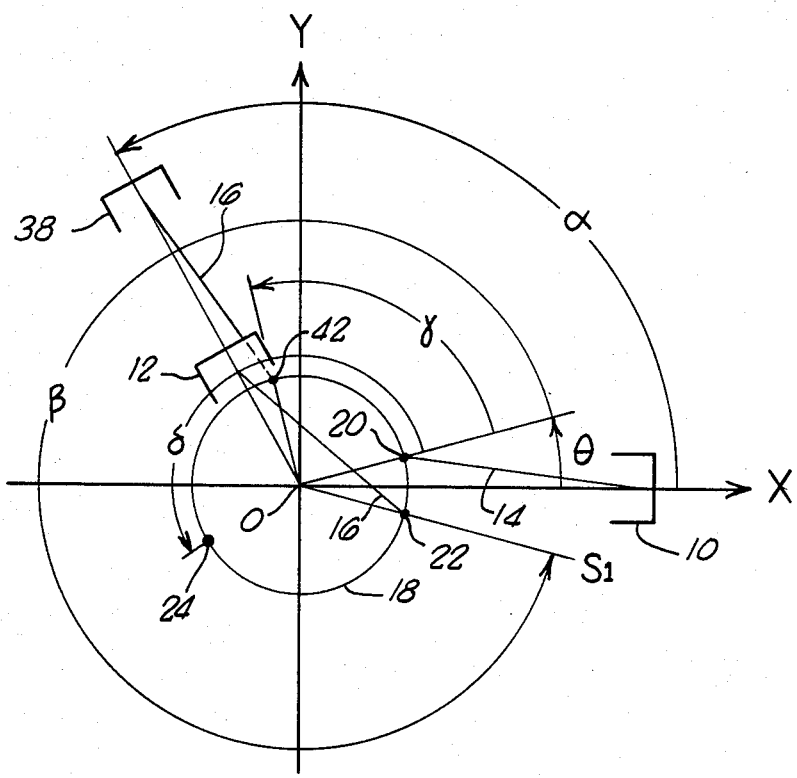
FIG. 3 is a schematic illustration of the angular arrangements between components in a V-type internal combustion engine having cylinders in multiples of three.
Figure 4:
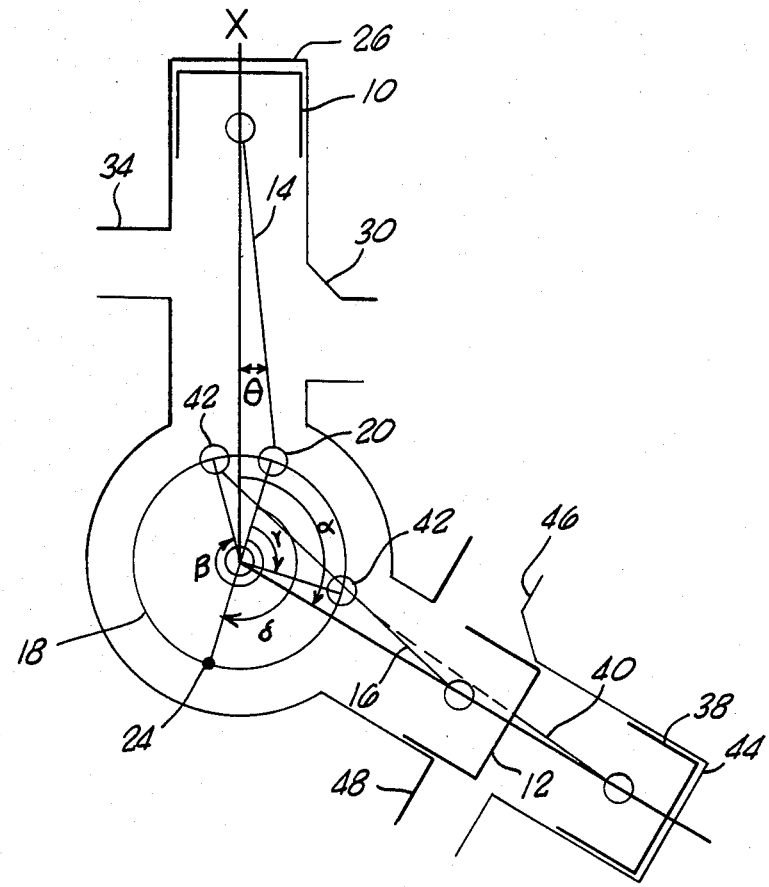
FIG. 4 is a schematic illustration of an embodiment of the engine of FIG. 3.

Turning then to the employment of a V-type multi-cylinder internal combustion engine having cylinders arranged in sets of three with an arbitarily established included angle between one cylinder of the set and the other two cylinders of the set, individual nonaligned crankpins and nonuniform interval firings may be employed. In the embodiments of FIGS. 3 and 4, the same terms for the components and angles have been employed where appropriate. Additionally, the third piston 38 in the set of three is illustrated and includes a connecting rod 40, a crankpin 42 and is positioned within a cylinder 44 having an intake 46 and an exhaust port 48. The angle between the first crankpin 20 and the third crankpin 42 is illustrated as γ. The linear inertia force for this third piston and the associated components is referred to as "Fc".

Following a parallel analysis to that provided above, the inertia forces for three piston set become:

$$Fa = W/g r\omega^2 \cos\theta \quad (17)$$

$$Fb = W/g r\omega^2 \{\cos(\theta + \beta - \alpha)\} e^{i\alpha} \quad (18)$$

$$Fc = W/g r\omega^2 \{\cos(\theta + \gamma - \alpha)\} e^{i\alpha} \quad (19)$$

in a complex plane.

A balance weight 24 of the weight A is integrally provided on a suitable position on crank 18 such that its centrifugal force Fw balances the sum of said linear inertia forces Fa, Fb, Fc:

$$Fw = A/g r\omega^2 \theta^{i\theta} \quad (20)$$

$$Fa + Fb + Fc = Fw \quad (21)$$

From the equations (17), (18) and (19), $$Fa + Fb + Fc = \quad (22)$$

$$\frac{W}{g} r\omega^2 [\cos\theta + \{\cos(\theta + \beta - \alpha)\} e^{i\alpha} + \{\cos(\theta + \gamma - \alpha)\} e^{i\alpha}]$$

And, those in the above brackets become:

$$\cos\theta + \cos(\theta + \beta - \alpha) e^{i\alpha} + \{\cos(\theta + \gamma - \alpha)\} e^{i\alpha} \quad (23)$$

$$= \cos\theta + \{\cos(\theta + \beta - \alpha)\}(\cos\alpha + i\sin\alpha) +$$

$$\{\cos(\theta + \gamma - \alpha)(\cos\alpha + i\sin\alpha)\}$$

$$= \cos\theta + \{\cos\theta \cdot \cos(\beta - \alpha) - 0\sin\theta \cdot$$

$$\sin(\beta - \alpha)\}(\cos\alpha + i\sin\alpha) + \{\cos\theta \cdot \cos(\gamma - \alpha) -$$

$$\sin\theta \cdot \sin(\gamma - \alpha)\}(\cos\alpha + i\sin\alpha)$$

$$= \cos\theta[1 + \cos(\beta - \alpha) \cdot \cos\alpha + i\cos(\beta - \alpha) \cdot \sin\alpha +$$

$$\cos(\gamma - \alpha) \cdot \cos\alpha + i\cos(\gamma - \alpha) \cdot \sin] -$$

$$\sin\theta[\sin(\beta - \alpha) \cdot \cos\alpha + i\sin(\beta - \alpha) \cdot \sin\alpha +$$

$$\sin(\gamma - \alpha) \cdot \cos\alpha + i\sin(\gamma - \alpha) \cdot \sin]$$

Generally, because that $$\cos\theta = \tfrac{1}{2}(\theta^{i\theta} e^{-\theta}),$$

$$\sin\theta = \tfrac{1}{2}i(e^{i\theta} - e^{-i\theta}),$$

then the above equation (23) becomes:

$$\frac{e^{-i\theta}}{2}[1 + \cos(\beta - \alpha) \cdot \cos\alpha + \cos(\gamma - \alpha) \cdot \cos\alpha - \quad (24)$$

$$\sin(\beta - \alpha) \cdot \sin\alpha - \sin(\gamma - \alpha) \cdot \sin\alpha +$$

$$i\{\cos(\beta - \alpha) \cdot \sin\alpha + \cos(\gamma - \alpha) \cdot \sin\alpha +$$

$$\sin(\beta - \alpha) \cdot \cos\alpha + \sin(\gamma - \alpha) \cdot \cos\alpha\}] +$$

$$\frac{e^{-i\theta}}{2}[1 + \cos(\beta - \alpha) \cdot \sin\alpha + \cos(\gamma - \alpha) \cdot \sin\alpha -$$

$$\sin(\beta - \alpha) \cdot \cos\alpha + \sin(\gamma - \alpha) \cdot \sin\alpha +$$

$$i\{\cos(\beta - \alpha) \cdot \sin\alpha + \cos(\gamma - \alpha) \cdot \sin\alpha -$$

$$\sin(\beta - \alpha)\cos\alpha - \sin(\gamma - \alpha) \cdot \cos\alpha$$

In order that the right side of said equation (20) and the right side of said equation (22) become equal so as to satisfy said equation (21), the real number part and imaginary number part in the second brackets of said equation (24) must be 0.

That is, $$1 + \cos(\beta - \alpha) \cdot \cos\alpha + \cos(\gamma - \alpha)\cos\alpha + \quad (25)$$

$$\sin(\beta - \alpha) \cdot \sin\alpha + \sin(\gamma - \alpha)\sin\alpha = 0$$

$$\cos(\beta - \alpha)\sin\alpha + \cos(\gamma - \alpha) \cdot \sin\alpha - \quad (26)$$

$$\sin(\beta - \alpha) \cdot \cos\alpha - \sin(\gamma - \alpha)\sin\alpha = 0$$

From the equation (25):

$$1 + \cos(\beta - \alpha - \alpha) + \cos(\gamma - \alpha - \alpha) = \quad (27)$$

$$1 + \cos(\beta - 2\alpha) + \cos(\gamma - 2\alpha) = 0$$

From the equation (26):

$$\sin(\beta - \alpha - \alpha) + \sin(\gamma - \alpha - \alpha) = \quad (28)$$

$$\sin(\beta - 2\alpha) + \sin(\gamma - 2\alpha) =$$

$$2\sin\frac{\beta - 2\alpha + \gamma - 2\alpha}{2} \cos\frac{\beta - \gamma}{2} = 0$$

From this:

$$\frac{\beta + \gamma - 4\alpha}{2} = \eta\pi, \quad \frac{\beta - \gamma}{2} = \frac{2\eta + 1}{2}\pi \quad (\eta = 0, 1 \ldots)$$

$$\beta + \gamma - 4\alpha = 2\eta\pi, \quad \beta - \gamma = (2\eta + 1)\pi$$

$$\beta + \gamma - 4\alpha = 0\pi, \quad \beta - \gamma = \pi$$

$$\beta + 2\alpha = -(\gamma - 2\alpha), \quad \pi - (\gamma - 2\alpha)$$

From $$\beta - 2\alpha = -(\gamma - 2\alpha)$$

and the equation (27):

$$1 + \cos\{-(\gamma - 2\alpha) + \cos(\gamma - 2\alpha) = 0 \quad (i)$$

$$\cos(\gamma - 2\alpha) = -\frac{1}{2}$$

$$\gamma - 2\alpha = \pm\frac{2\pi}{3}$$

$$\gamma = 2\alpha + \frac{2\pi}{3}, \quad 2\alpha - \frac{2\pi}{3}$$

And, $$\beta = 2\alpha - \frac{2\pi}{3}, \quad 2\alpha + \frac{2\pi}{3}$$

$$\beta - 2\alpha = \pi - (\gamma - 2\alpha) \text{ and} \quad (ii)$$

$$1 - \cos(\gamma - 2\alpha) + \cos(\gamma - 2\alpha) = 1 \neq 0$$

$$\beta - \gamma = \beta - 2\alpha - (\gamma - 2\alpha) = \pi$$

$$\beta - 2\alpha = \pi + (\gamma - 2\alpha)$$

$$1 - \cos(\gamma - 2\alpha) + \cos(\gamma - 2\alpha) = 1 \neq 0$$

From the foregoing relations:

$$\beta = 2\alpha + 120 \quad (29) \qquad \gamma = 2\alpha - 120° \quad (30)$$

$$\text{co}\gamma\, \beta = 2\alpha - 120°; \qquad \gamma = 2\alpha + 120°)$$

In order to satisfy the equation (29) and the equation (30), the linear inertia forces Fa, Fb, Fc possessed by the three sets of reciprocating parts are balanced by the centrifugal force F of the balance weight 24.

In this case, the weight A of the balance weight is:

$$A = \tfrac{1}{2} W \sqrt{U^2 + V^2} \quad (31)$$

where $$U = 1 + \cos(\beta - \alpha)\cdot\cos\alpha + \cos(\gamma - \alpha)\cdot\cos\alpha - \sin(\beta - \alpha)\cdot\sin\alpha - \sin(\gamma - \alpha)\cdot\sin\alpha$$

$$V = \cos(\beta - \alpha)\cdot\sin\alpha + \cos(\gamma - \alpha)\cdot\sin\alpha + \sin(\beta - \alpha)\cdot\cos\alpha - \sin(\gamma - \alpha)\cdot\cos\alpha$$

And, from the equation (24) the installed angle of the balance weight 24 becomes:

$$\tan \delta = V/U \quad (32)$$

Looking specifically to the embodiment of FIG. 4, the included angle between the first cylinder and the bank of two cylinders was selected to be 105°. In accordance with equations (29) and (30), and are 330° and 90°, respectively. The balance weight 24, pursuant to equation (32) has an angle of 195° and a weight A equal to $W/2 + \sqrt{3}$ in accordance with equation (31).

Forces Fa, Fb and Fc in this embodiment are thus:

$$Fa = W/gr\omega^2 \cos \theta$$

$$Fb = W/gr\omega^2 \cos(\theta - 5/4\pi)e^{i\alpha}$$

$$Fc = W/gr\omega^2 \cos(\theta - \pi/12)e^{i\alpha}$$

and the centrifugal force F of the balance weight is:

$$Fw = W/gr\omega^2 \tfrac{1}{2}\sqrt{2+\sqrt{3}}\, e^{i\theta} \quad (33)$$

from the equations (20) and (31).

As is clear from the equations (22), (23) and (24), the sum of said inertia forces Fa, Fb, Fc is:

$$Fa + Fb + Fc = W/gr\omega^2 \tfrac{1}{2}(2+\sqrt{3}+i)e^{i\theta}$$

and the absolute value of its complex number $2+\sqrt{3}+i$ is $2\sqrt{2+\sqrt{3}}$, so that:

$$Fa + Fb + Fc = W/gr\omega^2 \tfrac{1}{2}\sqrt{2+\sqrt{3}}\, e^{i\theta} \quad (34)$$

then, the equation (33) and the equation (34) are equal, and therefore, in the embodiment shown in FIG. 4, the linear inertia forces Fa, Fb, Fc possessed by the first, second, third reciprocating parts balance the centrifugal force F of the balance weight 24, resulting in less vibration.

In this embodiment, the cylinder included angle is made to be 105°; however, the cylinder included angle may freely be set at an angle other than 105°, and the crankpin relative angles $\beta$, $\gamma$ can be determined from the equations (29) and (30). In this case, the weight A and installed angle of the balance weight 24 are determined by the equations (31) and (32).

The balance weight 24 is shown to be disposed concentratedly at one point; however, the balance weight 24 may be divided into three pieces, each being installed on the crank 18 of each cylinder, in which case, the weight A and installed angles $\delta_1$, $\delta_2$, $\delta_3$ of the divided balance weights 24 may be calculated in the same manner as described before.

In V-type three-multiple-cylinder internal combustion engines comprising as described before in-line even-number cylinders and cylinders in half the number thereof and providing specified balance weights at specified points, makes $\beta = 2\alpha + 120°$, $\gamma = 2\alpha - 120°$, so that whatever the cylinder included angle is set to be, the linear term of residual unbalanced inertia force of the reciprocating mass can be negated by the balance weight provided on the crank, making its possible to provide internal combustion engines with less vibration.

Thus, engines employing arbitrary included angles between banks of a V configuration where cylinders in multiples of two and three are provided is disclosed which can accommodate linear residual inertia forces. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An engine comprising at least one pair of cylinders including a first cylinder and a second cylinder, each said pair of cylinders being arranged in a V having an included angle $\alpha$;

a crank including at least a pair of nonaligned crankpins, a first crankpin of each said pair being positioned and arranged for use with said first cylinder and a second crankpin of each said pair being positioned and arranged for use with said second cylinder, said second crankpin being arranged on said crank at an angle $\beta$ from said first crankpin as measured in a first direction about said crank substantially equal to 180 less than twice said included angle $\alpha$ of said pair of cylinders;

a reciprocating mass including a piston and connecting rod for each of said cylinders and crankpins, each said connecting rod being connected at a first end to said piston and at a second end to said crankpin for each of sayd cylinders;

a balance weight attached to said crank, said balance weight being attached at a balance angle $\delta$ measured in said first direction about said crank from said first crankpin whose tangent is substantially equal to U/V where $$U = 1 + \cos(\beta-\alpha)\cos\alpha - \sin(\beta-\alpha)\cdot\sin$$

$$V = \cos(\beta-\alpha)\sin\alpha + \sin(\beta-\alpha)\cdot\cos\alpha,$$

said balance weight being mounted at an equivalent radius to said crankpins and being equal in weight to substantially one-half the weight of one of said reciprocating masses multiplied by the square root of the sum of the squares of U and V.

* * * * *